Patented Oct. 15, 1935

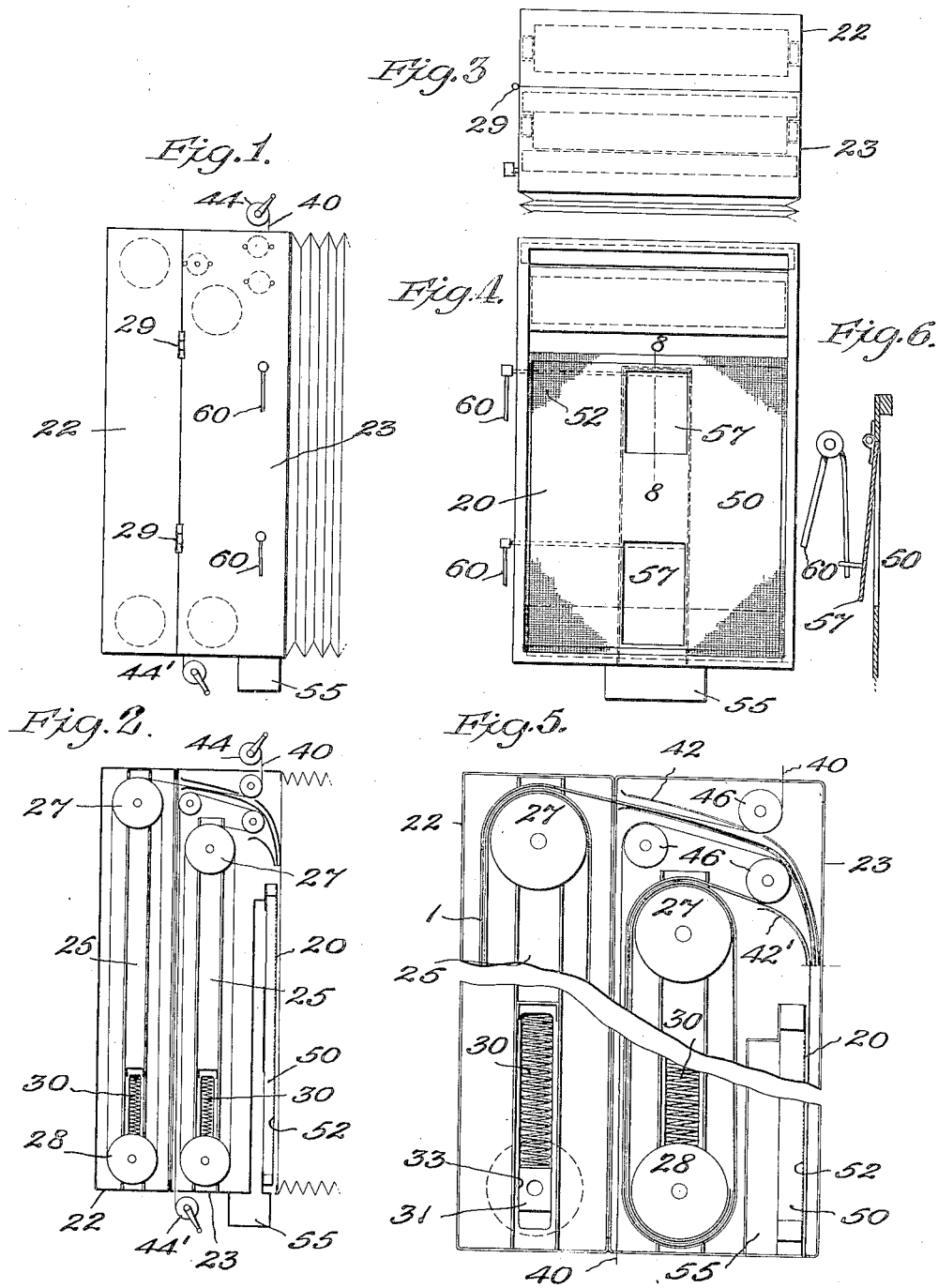

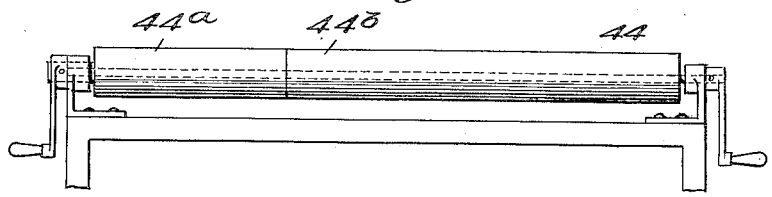
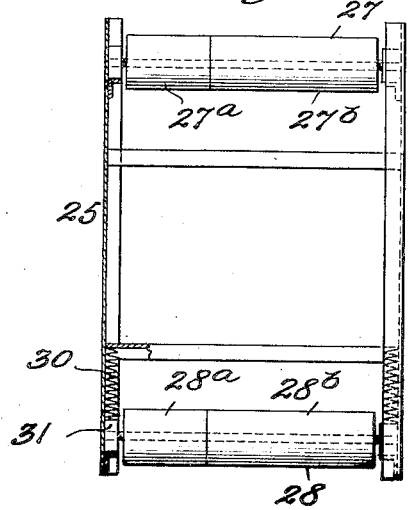

2,017,096

UNITED STATES PATENT OFFICE 2,017,096

APPARATUS FOR HOLDING AND FEEDING PHOTOGRAPHIC FILM-SHEETS IN CAMERAS

John H. Hogan, New York, N. Y.

Application February 16, 1934, Serial No. 711,465

11 Claims. (Cl. 95—31)

The invention relates to a photographic camera especially suitable for the photolithographic and photo-engraving industries, particularly to that part having to do with the holding of the film-sheet supply, the film-sheet holder for holding the film-sheet at the position were it is to be exposed, and the means for feeding the film-sheet to the film-sheet holder, and provides improvements therein.

In the photolithographic and photo-engraving industries, and particularly that part forming constituents of or allied with the newspaper industry, great speed is a prime desideratum in forming the photo-engravings, or other printing forms, from photographs. The importance of speed in the newspaper industry is described in a pamphlet published by "The News" of New York city, as follows:

"Making a newspaper differs from other manufacturing processes, because it deals in the most perishable product in the world. The newspaper's principal raw material, news, is gathered fresh every day—is stale, outmoded, spoiled, useless 24 hours later. At noon the editorial cupboard is practically bare. Within a few hours, the crop of news has been harvested; the threshing of the important from the unessential completed; the process of publishing is well under way.

"Speed is the essence of newspaper publishing—from the second a story starts somewhere, to the truck which carries away the printed paper. So the whole newspaper staff is organized for speed—speed in photography, phoning, writing, editing, typesetting, engraving, making-up, stereotyping, casting, printing, delivery. Increasing circulation, larger papers and competition compel more speed. Any device which does work faster is adopted. The new autocasters make a cast automatically every fifteen seconds; the operation used to take a minute. Presses printing 20,000 papers an hour are being supplemented by presses of greater speed and production. So it goes."

In photo-engraving shops large photographic cameras are used capable of taking photographs of a large variety of sizes and having a magazine capable of accommodating a supply of film-sheet sufficient to meet the requirements of making a large number of photographs in a day.

My invention provides in a camera of the kind referred to, means for holding and economically disposing a large supply of film-sheet; and for readily manipulating the film-sheet to obtain great flexibility and speed in the taking of pictures, and for providing for the ready replacement of the supply of film-sheet.

The film-sheets used in the cameras now used in photo-engraving shops are composed of a backing of paperboard, and a film of gelatine containing the light-sensitive salts.

An embodiment of the photographic apparatus, is illustrated in the accompanying drawings, wherein:

Fig. 1 is a side elevation of my improved camera-parts (the optical part being omitted in this and in the remaining figures).

Fig. 2 is a vertical longitudinal section through Fig. 1.

Fig. 3 is also a top plan view of Fig. 1.

Fig. 4 is a view in elevation, looking into the camera illustrated in Fig. 1 from the right-hand side.

Fig. 5 is an enlarged sectional view corresponding to Fig. 2.

Fig. 6 is a sectional view illustrating a part of the means for holding a film-sheet against the film-holder on which the film is "exposed".

Fig. 7 is a detail view illustrating a modified arrangement for holding and separately feeding two or more film-sheets from one reel.

Fig. 8 is a view of a reel which is detachable from the magazine of the camera.

A film-sheet I comprising a film and a backing is used in the camera for making a succession of photographic pictures or images, the individual pictures or images being separated from the film-sheet by severing the corresponding parts of the film-sheet.

Referring now particularly to Figs. 1 to 6 of the drawings, numeral 20 designates the film-sheet holder facing the optical parts of the camera, and on which the film is "exposed".

Behind the film-sheet holder 20 are one or more shallow magazines 22, 23 for containing a supply of the film-sheet I. Suitable means for providing access to the magazine or magazines, for replenishment of the film-sheet, is provided. The magazines 22, 23 may be hinged as indicated at 29, so as to be swung apart to give such access thereto. The magazine 22 is conveniently open at the front and the magazine 23 open at the back, the latter magazine conveniently forming an integral part of the camera.

The film-sheet is wound on reels 25 preferably comprising spaced rolls 27, 28, around which the film-sheet I passes so as to be supported thereon in a plurality of superposed loops. Means are preferably provided for maintaining a moderate tension on the loops of film-sheet passing around the rollers. This means conveniently comprises springs 30 pressing on the bearing blocks 31 of one of the rollers, as the roller 28, guides 33 being conveniently provided for the bearing blocks 31.

The character of the reels 25 by which the film-sheet 1 is supported in the magazine in superposed loops, adapts the magazines most beneficially to the dimensions of the camera, and provides a large capacity of film-sheet for the space within the magazine. A gain in compactness for the camera as a whole is obtained.

Wound around the rollers 27, 28 with the film-sheet is a web or tape 40, of stout paper, woven fabric, etc., for example, which may also serve to protect the film from light.

The tape 40 and the free end of the film-sheet pay off from the reel 25, and the film-sheet preferably traverses a guide 42 (42') to a position alongside of the film-sheet-holder 20. The tape 40 runs to a position or device by which it may be pulled, being conveniently attached to a draw-roll 44 (44') which may be outside of the camera. To draw successive portions of film-sheet from a reel 25 to a position in front of the film-sheet-holder 20, the draw-roll 44 is turned (by a handle for instance) pulling and winding the tape 40, the latter drawing with it film-sheet 1 from the reel. 46 designates suitable guide-rolls for the tape.

The reels 25 preferably comprise frames separable from the magazines, as illustrated in Fig. 8, to facilitate the replacement of depleted reels to replenish the supply of film-sheet for the camera.

The film-sheet-holder 20 is preferably in the form of a hollow-box 50 (partitioned or not as desired) having a foraminous cover or plate 52 against which overlying portions of film-sheet are arranged to be pressed. For pressing said portions of the film-sheet, the box 50 may be connected to a suction-device through a duct 55, the sub-pressure in the box 50 acting to draw and hold the film-sheet 1 against the plate 52 in a manner well understood.

For relieving the film-sheet on the plate 52 from pressure, valves 57 (Fig. 6) may be provided for closing the box 50 to the suction duct 55. Operating connections 60 extending to the outside of the camera provided for manipulating the valves 57.

Instead of the rolls 27, 28 being continuous across the magazine they may be divided into two or more shorter rolls, 27a, 27b, 28a, 28b, and corresponding draw-rolls 44a, 44b, provided, Fig. 8, for drawing off film-sheet from each of the pairs of rolls 27a, 28a, 27b, 28b. This enables film-sheet of different width to be wound on each of these pairs of rolls, so that film-sheet best suited to the size of photograph to be made may be drawn from the reels.

Operation:—To make a photograph in the camera, one or another of the tapes 40 is pulled (by the draw-roll 44, 44', 44a, 44b, for example) drawing a suitable length of film-sheet 1 from one or another of the reels 25 to a position in front of the film-holder 20. The sub-pressure in the box 50 will draw and hold the overlying portion of film-sheet 1 against the plate 52 of the film-holder. The film on the film-holder may thereupon be exposed. After exposure, the portion of the film-sheet 1 on which the picture has been "taken" may be severed, removed, and the usual procedure for "fixing", "developing", etc. the film carried out. One or more of the valves 57 may be manipulated for controlling the pressure in the suction box 50, as desired or suitable.

The invention may receive other embodiments than those herein specifically illustrated and described.

What is claimed is:

1. In a camera, a film-sheet magazine, and means for supporting a film-sheet in superposed loops therein, the shape of the interior of said magazine conforming to the solid figure outlining the loaded film-sheet supporting means.

2. In a camera, a film-sheet magazine, and means for supporting a film-sheet in superposed loops therein, said means comprising a pair of spaced rolls, the shape of the interior of said magazine conforming to the solid figure outlining the loaded film-sheet supporting means.

3. In a camera, a film-sheet magazine, and means for supporting a film-sheet in superposed loops therein, said means comprising a pair of spaced rolls and resilient means for pressing said rolls apart in such manner as to tension the loops of film-sheet looped around said rolls.

4. In a camera, a film-sheet magazine, means for supporting a film-sheet and a feed-web in superposed loop therein, a film-sheet-holder, and means for drawing on said web to feed said film-sheet to said holder.

5. In a camera, a film-sheet magazine, and means for supporting film-sheet in superposed loops therein, said means comprising a plurality of pairs of spaced rolls, each pair being arranged to one side of, and on axes common to, another pair of rolls.

6. In a camera, a film-sheet magazine, and means for supporting film-sheet and a feed-web in superposed loops therein, said means comprising a plurality of pairs of spaced rolls, each pair being arranged to one side of, and on axes common to, another pair of rolls, and means for drawing in the web on each pair of rolls for separately feeding film-sheet.

7. In a camera, a film-sheet magazine, means for supporting a film-sheet therein, and a film-sheet-holder comprising a foraminous plate, means for feeding film sheet from said support to a vertical hanging position in front of said plate, and means for maintaining a suction behind said plate to draw and hold an overlying piece of film-sheet against said plate.

8. In a camera, a film-sheet magazine, a plurality of means for supporting a film-sheet therein, and a film-sheet-holder comprising a foraminous plate, means in connection with each film-sheet support for feeding film-sheet as desired from anyone of the supporting means to a vertical hanging position, in front of said plate, and means for maintaining a suction behind said plate to draw and hold an overlying piece of film-sheet against said plate.

9. In a camera, a film-sheet magazine, means for supporting a film-sheet therein, and a film-sheet-holder comprising a foraminous plate, means in connection with each film-sheet support for feeding film-sheet as desired from any one of the supporting means to a vertical hanging position, in front of said plate, and means for maintaining a suction behind said plate to draw and hold an overlying piece of film-sheet against said plate and a valve and operating means for cutting said plate off from said suction-means to release said film-sheet, and vice versa.

10. In a camera, a plurality of film-sheet magazines arranged in alinement one behind another, the magazines being open at their meeting faces, and means in each magazine for supporting film-sheet in superposed loops therein.

11. In a camera, a plurality of film-sheet magazines arranged in alinement one behind another, the magazines being open at their meeting faces, and means in each magazine for supporting film-sheet in superposed loops therein, said means comprising separable reels comprising pairs of superposed rolls.

JOHN H. HOGAN.